United States Patent
Mandel et al.

(10) Patent No.: US 10,171,666 B2
(45) Date of Patent: *Jan. 1, 2019

(54) PREDICTIVE ROUTING

(71) Applicant: DIRECTLY SOFTWARE, INC., San Francisco, CA (US)

(72) Inventors: Eugene Mandel, Sebastopol, CA (US); Jeff Patterson, Pleasant Hill, CA (US)

(73) Assignee: Directly Software, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/488,411

(22) Filed: Apr. 14, 2017

(65) Prior Publication Data

US 2017/0249566 A1 Aug. 31, 2017

Related U.S. Application Data

(63) Continuation of application No. 15/476,789, filed on Mar. 31, 2017, which is a continuation-in-part of application No. 15/138,166, filed on Apr. 25, 2016, now Pat. No. 9,654,640, which is a continuation-in-part of application No. 14/619,012, filed on Feb. 10, 2015, now Pat. No. 9,325,849.

(60) Provisional application No. 62/045,520, filed on Sep. 3, 2014, provisional application No. 61/953,665, filed on Mar. 14, 2014, provisional application No. 62/045,520, filed on Sep. 3, 2014, provisional application No. 61/953,665, filed on Mar. 14, 2014, provisional application No. 62/446,826, filed on Jan. 16, 2017, provisional application No. 62/471,305, filed on Mar. 14, 2017.

(51) Int. Cl.
| | |
|---|---|
| G06N 5/04 | (2006.01) |
| G06N 7/00 | (2006.01) |
| H04M 3/51 | (2006.01) |
| G06F 17/30 | (2006.01) |
| G06N 99/00 | (2010.01) |
| G06Q 10/06 | (2012.01) |
| G06Q 30/00 | (2012.01) |
| H04M 3/523 | (2006.01) |

(52) U.S. Cl.
CPC .... *H04M 3/5233* (2013.01); *G06F 17/30598* (2013.01); *G06N 5/04* (2013.01); *G06N 7/005* (2013.01); *G06N 99/005* (2013.01); *G06Q 10/063112* (2013.01); *G06Q 30/016* (2013.01); *H04M 3/5166* (2013.01)

(58) Field of Classification Search
CPC .............. H04M 3/5233; H04M 3/5191; G06F 17/30598; G06N 7/005; G06N 99/005; G06Q 10/063112; G06Q 30/016
USPC ................................ 379/265.01, 266.01, 309
See application file for complete search history.

(56) References Cited

U.S. PATENT DOCUMENTS

| | | | |
|---|---|---|---|
| 6,704,409 B1 * | 3/2004 | Dilip ..................... | H04M 3/523 379/243 |
| 7,372,952 B1 * | 5/2008 | Wu ..................... | H04M 3/5233 370/352 |

* cited by examiner

*Primary Examiner* — Quynh H Nguyen
(74) *Attorney, Agent, or Firm* — Royse Law Firm, PC

(57) ABSTRACT

In a crowd sourcing approach, responses to customer service inquiries are provided by routing a subset of the inquiries town independent group of experts. The customer service inquiries are optionally routed to specific experts based on matches between identified subject matter of the inquiries and expertise of the experts. Embodiments include an AI based system configured to determine which of the inquiries should be routed to the independent group of experts. The expert system is optionally trained based on scored responses to prior customer service inquiries.

26 Claims, 3 Drawing Sheets

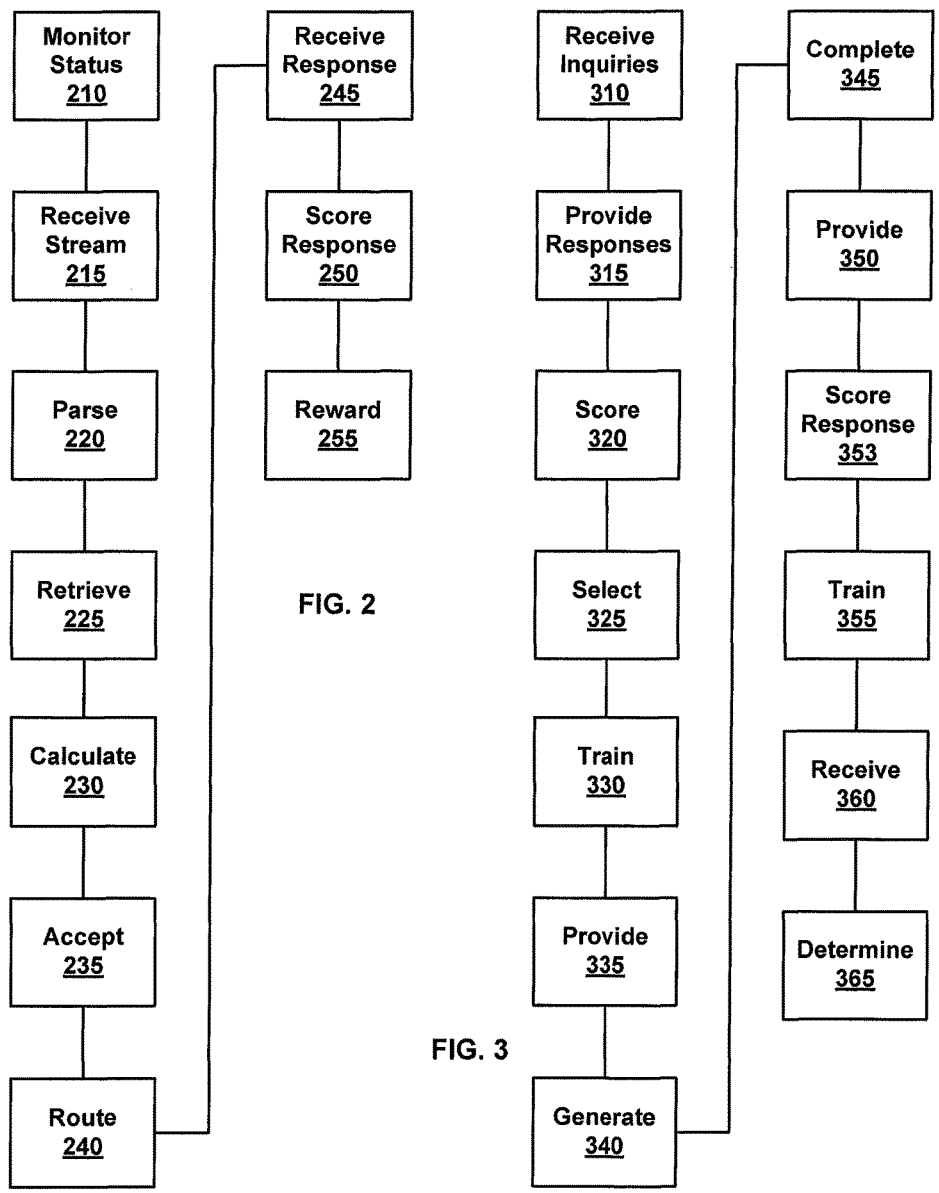

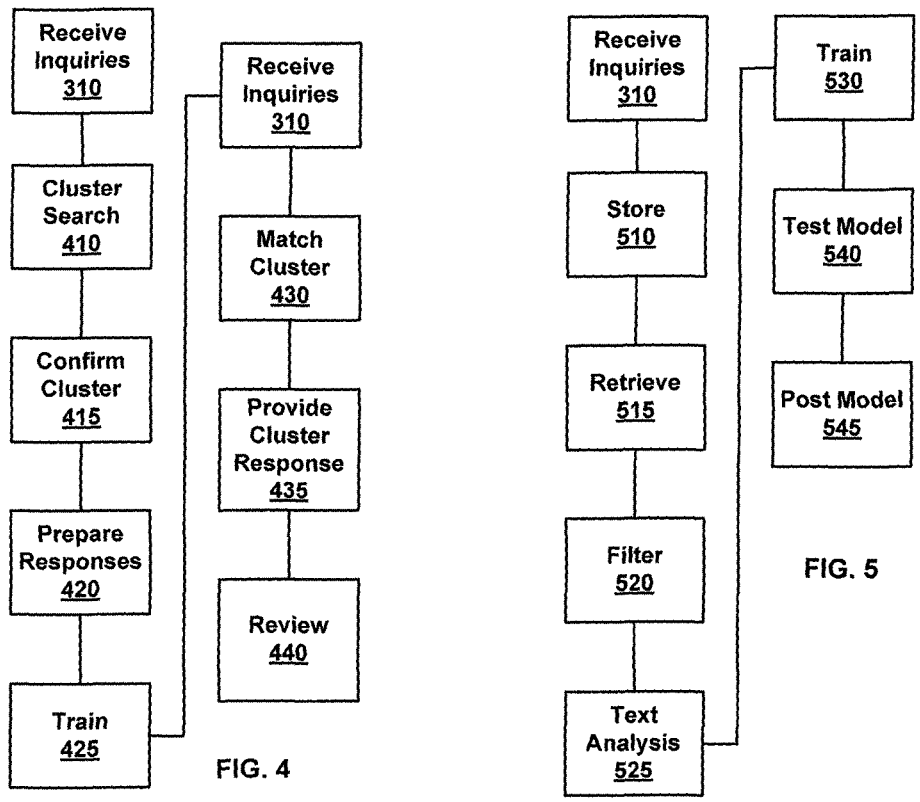
FIG. 4
FIG. 5
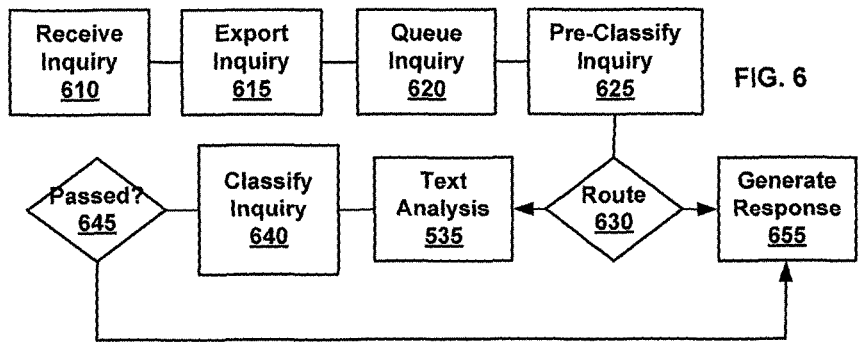
FIG. 6

PREDICTIVE ROUTING

CROSS-REFERENCE TO RELATED APPLICATIONS

This application is a continuation of U.S. patent application Ser. No. 15/476,789 filed Mar. 31, 2017, which in turn is: a continuation-in-part of U.S. patent application Ser. No. 15/138,166 filed Apr. 25, 2016, which in turn is a continuation-in-part of U.S. patent application Ser. No. 14/619,012, filed Feb. 10, 2015 (now U.S. Pat. No. 9,325,849), which in turn claims benefit and priority to U.S. provisional patent application Ser. No. 61/953,665 filed Mar. 14, 2014 and U.S. provisional patent application Ser. No. 62/045,520 filed Sep. 3, 2014; U.S. patent application Ser. No. 15/476,789 further claims priority and benefit of U.S. provisional patent application Ser. No. 62/446,826 filed Jan. 16, 2017 and Ser. No. 62/471,305 Filed Mar. 14, 2017. The contents of the above provisional and non-provisional patent applications are hereby incorporated herein by reference.

BACKGROUND

Field of the Invention

The invention is in the field enterprise information management, and more specifically in the field of routing and managing customer service inquiries, and/or other types of workflow activities.

Related Art

Typical customer service systems include a contact center configured to communicate with customers by voice, chat, video, text, e-mail, social media, and/or other channels. These systems often include a series of questions that are presented to a customer and configured to identify the customer's needs. For example, a customer calling to a contact center may be asked to enter numbers on their phone to route the call to a specific group of service personnel. The customer is typically placed in a queue and then transferred to the next available service person. Such contact centers are expensive to establish and maintain.

SUMMARY

Some embodiments of the current invention include systems and methods of providing improved customer service. These improved services are achieved by processing and potentially resolving customer service inquiries prior to or after these inquiries have been routed to a contact center. The processing includes presenting the customer service inquiries to one or more "experts." These experts may be independent persons having experience or qualifications in the subject of the customer service inquiry. Optionally, customer service inquiries that are not resolved by an expert are eventually forwarded to agents in an enterprise contact center.

Experts are managed by computing systems configured to determine which expert should receive a particular customer service inquiry, to determine which experts are currently available, to manage rewards, and/or to generate expert scores. Customer service inquiries are routed by the computing systems to establish communication channels between the expert and source of the service inquiry. These computing systems are thus configured via specific computing instructions to produce a specific purpose computing system.

Various embodiments include an expert management system configured to manage customer service inquiries, the system comprising a request I/O configured to receive a customer service inquiry; an inquiry parser configured to determine one or more topic characteristics of the inquiry; status logic configured to monitor statuses of a plurality of experts; expert data storage configured to store data characterizing one or more specialty characteristics of each of the plurality of experts; routing data storage configured to store logs of inquiry routing; matching logic configured to match the inquiry to a first human expert of the plurality of human experts, the matching being based on the one or more expert score of the first human expert and a correlation between the topic characteristics of the inquiry and the specialty characteristics of the first human expert; scoring logic configured to generate the one or more expert score based on response ratings of responses provided by the first human expert; and routing logic configured to route the inquiry to the first human expert. The expert management system optionally further includes service interface logic configured for the first human expert to communicate with a source of the customer service inquiry; automated response logic configured to generate an automated response to the inquiry, the automated response being based on the topic characteristics of the inquiry and including a predetermined answer to the inquiry; reward logic configured to provide a reward to the first human expert as consideration for providing an answer to the customer service inquiry; and/or response log storage configured to store responses to the customer service inquiry, the stored responses being accessible to the plurality of human experts.

Various embodiments of the invention comprise an expert management system configured to manage customer service inquiries, the system comprising: a request I/O configured to receive a stream of customer service inquiries; status logic configured to monitor statuses of a plurality of human experts; expert data storage configured to store data characterizing one or more specialty characteristics of each of the plurality of experts; automated response logic configured to provide at least partial responses to the customer service inquiries; matching logic including a first machine learning system configured to predict an ability of the automated response logic to provide satisfactory responses to particular members of the customer service inquires and/or to predict an ability of human experts to provide satisfactory responses to particular members of the customer service inquiries; and routing logic configured to route the customer service inquiries to members of the human experts or the automated response logic, in the alternative, based on the predicted ability.

Various embodiments of the invention comprise an expert management system configured to manage customer service inquiries, the system comprising: a request I/O configured to receive a stream of customer service inquiries; status logic configured to monitor statuses of a plurality of human experts; expert data storage configured to store data characterizing one or more specialty characteristics of each of the plurality of experts; automated response logic configured to provide at least partial responses to the customer service inquiries; routing logic configured to route the customer service inquiries to members of the human experts and the automated response logic; and reward logic configured to track responses contributed by a first of the human experts and to provide a reward to the first of the human experts when the automated response logic provides an at least partial response that includes content contributed by the first of the human experts.

Various embodiments of the invention comprise a method of processing a first customer service inquiry, the method comprising: receiving a plurality of customer service inquiries; providing responses to the customer service inquires, the responses being generated using a plurality of human experts; generating a score for each of the responses; selecting a first subset of the responses associated with higher scores relative to a second subset of the responses; training a first machine learning system using the first subset of the responses; providing the first customer service inquiry to the first machine learning system; and generating at least a partial response to the first customer service inquiry using the first machine learning system.

Various embodiments of the invention comprise an expert management system configured to manage customer service inquiries, the system comprising: a request I/O configured to receive a stream of customer service inquiries; an inquiry parser configured to determine one or more topic characteristics of each of the customer service inquiries; status logic configured to monitor statuses of a plurality of experts; expert data storage configured to store data characterizing one or more specialty characteristics of each of the plurality of experts; acceptance logic configured to accept a subset of the inquires for processing by a first human expert, the acceptance being based on availability of the first human expert and predicted probabilities that the first human expert will be able to resolve each member of the subset of inquiries, the first human expert being a member of the plurality of experts; and routing logic configured to route the subset of inquiries to the first human expert.

Various embodiments of the invention comprise an expert management system configured to manage customer service inquiries, the system comprising: a request I/O configured to receive a stream of customer service inquiries; an inquiry parser configured to determine one or more topic characteristics of each of the inquiries; status logic configured to monitor statuses of a plurality of human experts; expert data storage configured to store data characterizing one or more specialty characteristics of each member of the plurality of experts; acceptance logic configured to estimate probabilities that at least one human expert or an automated response will be able to resolve each of the customer service inquiries, and configured to accept a subset of the inquires for processing based on the estimated probabilities, at least one probability being calculated for each of the customer service inquiries; and routing logic configured to route the inquiry to the at least one human expert or automated response logic.

Various embodiments of the invention comprise a method of processing a customer service inquiry, the method comprising: monitoring status of a plurality of experts; receiving a stream of customer service inquiries; parsing each of the customer service inquiries to determine one or more topic characteristics of each of the customer service inquiries; retrieving specialty characteristics of each of the plurality of experts from a data storage; calculating a probability that each of the plurality of experts can resolve each of the customer service inquiries, the calculation being based on the topic characteristics of each inquiry and the specialty characteristics of each of the plurality of experts; accepting a subset of the plurality of inquiries by comparing 1) a threshold and 2) the calculated probability of each inquiry being resolved by a human expert, the human expert being a member of the plurality of experts; and routing each member of the subset to at least one member of the plurality of experts.

Various embodiments of the invention include an expert management system configured to manage customer service inquiries, the system comprising: a request I/O configured to receive a stream of customer service inquiries; status logic configured to monitor statuses of a plurality of human experts; expert data storage configured to store data characterizing one or more specialty characteristics of each of the plurality of experts; cluster detection logic configured to assign the customer service inquiries to clusters of the customer service requests, the clusters having common characteristics or being satisfied using similar responses; matching logic to match individual human experts to particular members of the customer service inquiries, the matching being at least partially based on membership of the particular customer service request being in particular members of the identified clusters; and routing logic configured to route the customer service inquiries to members of the human experts.

Various embodiments of the invention include 10. An expert management system configured to manage customer service inquiries, the system comprising: a request I/O configured to receive a stream of customer service inquiries; status logic configured to monitor statuses of a plurality of human experts; expert data storage configured to store data characterizing one or more specialty characteristics of each of the plurality of experts; automated response logic configured to provide at least partial responses to the customer service inquiries; cluster matching logic configured to assign members of the customer service inquiries to clusters of customer services inquires, the clusters including common topics and requiring similar responses; matching logic including a first machine learning system configured to predict an ability of the automated response logic to provide satisfactory responses to particular members of the customer service inquires and to predict an ability of human experts to provide satisfactory responses to particular members of the customer service inquiries, wherein the predicted ability is at least partially based on inclusion of particular members of the customer service inquires in an cluster; and routing logic configured to route the customer service inquiries to members of the human experts or the automated response logic, in the alternative, based on the predicted ability.

Various embodiments of the invention include a method of classifying customer service inquiries, the method comprising: receiving a plurality of customer service inquiries; searching the customer service inquiries to identify those that fall into previously identified clusters; using the identified customer service inquiries to train matching logic, the matching logic being configured to match the customer service inquires to specific experts; receiving additional customer service inquiries; matching the additional customer service inquiries to human experts, using the trained matching logic; and routing the additional customer service inquiries to the matched human experts.

Various embodiments of the invention include a method of training a machine learning system, the method comprising: receiving a plurality of customer service inquiries, each of the customer service inquiries being associated with a respective response to that customer service inquiry; analyzing content of each of the customer service inquires to place the content in a form for automated understanding by the machine learning system; training the machine learning system using the customer service inquiries, the associated responses and response scores associated with each of the responses; testing the trained machine learning system using additional customer service inquiries, responses to the additional customer service inquires and response scores associated with each of these response scores; and using the trained machine learning system to process further customer service inquiries, the use being based on the trained machine learning system passing the testing.

Various embodiments of the invention include a method of processing customer service requests, the method comprising: receiving a customer service inquiry; placing the customer service inquiry in a queue for processing; pre-classifying the customer service inquiry; routing the customer service inquiry according to the pre-classification of the customer service inquiry; classifying the customer service inquiry according to whether it can be answered by an automated response logic, by an internal expert, or by an external expert, in the alternative; routing the customer service inquiry to be answered by the automated response logic, by the internal expert or the external expert, according to the classification of the customer service inquiry; and generating a response to the customer service inquiry using the automated response logic, by the internal expert or the external expert; and providing the response to a source of the customer service inquiry.

BRIEF DESCRIPTION OF THE DRAWINGS

FIG. 2 illustrates a method of processing a customer service inquiry, according to various embodiments of the invention.

FIG. 3 illustrates a method of automatically processing a customer service inquiry, according to various embodiments of the invention.

FIG. 4 illustrates a method of classifying customer service inquiries, according to various embodiments of the invention.

FIG. 5 illustrates methods of training a machine learning system using training logic, according to various embodiments of the invention.

FIG. 6 illustrates methods of processing customer service requests, according to various embodiments of the invention.

DETAILED DESCRIPTION

Figure 1:
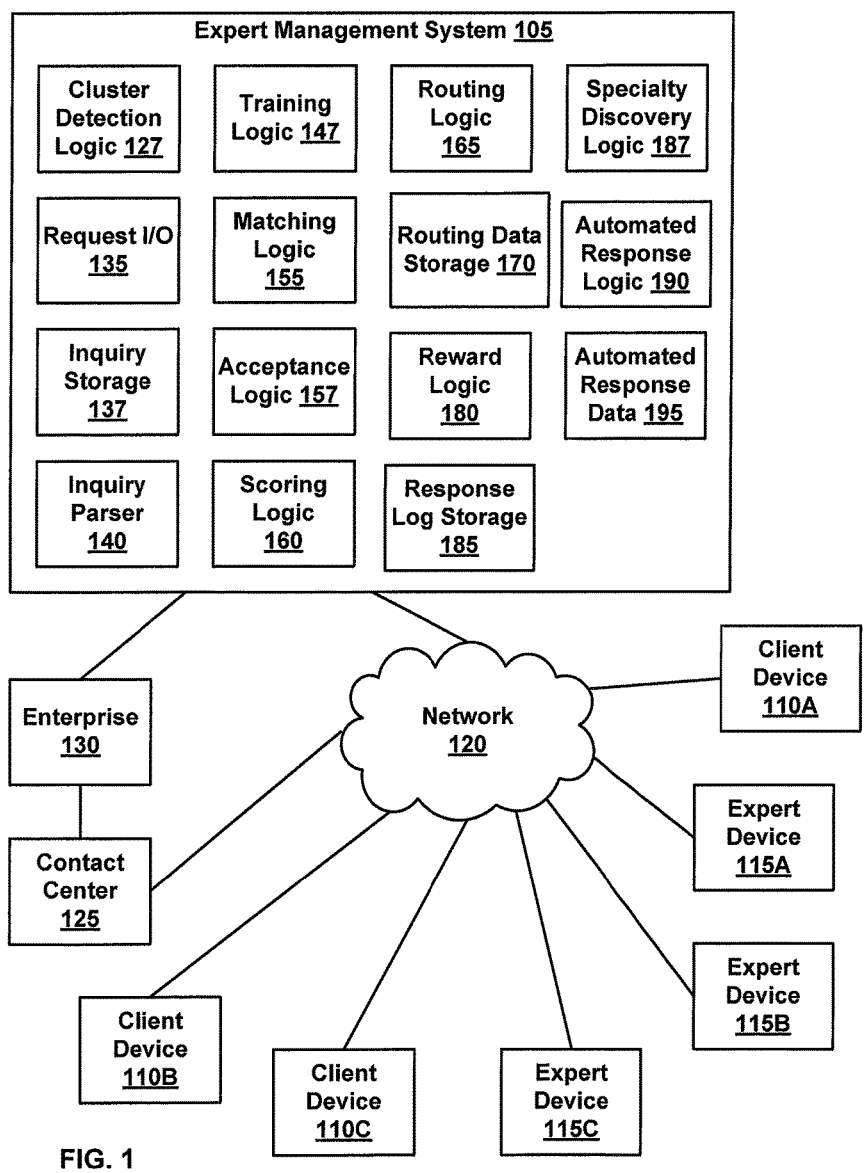
FIG. 1 illustrates customer service architecture, according to various embodiments of the invention.

The systems and methods described herein are directed toward the resolution of customer service inquiries. For example, they may be used to generate one or more responses to a customer service inquiry. The customer service inquiry may be received directly from a customer or prospective customer ("a requester"). Alternatively, the customer service inquiry may be first communicated from a requester to a customer contact center (e.g., call center) and then forwarded from the contact center to the expert management systems described elsewhere herein. The inquiries are resolved by first routing the inquiries to an expert management system and then, if needed, the inquiries are routed to a contact center. The routing is based on a rule set that is configured to reduce the number of inquiries received by the contact center while, at the same time, assuring minimum levels of response quality, response time, and/or customer satisfaction. These rules are optionally embodied in an expert system and/or trained artificial intelligence/neural network/machine learning system. Typically, resolving inquiries using the expert management system is more cost effective than having the inquiries resolved by the contact center. As used herein the term "machine learning system" is meant to include expert systems, artificial intelligence systems, artificial neural networks, Bayesian statistical processors, and/or the like.

While a contact center is typically managed or under contract with a specific enterprise, experts managed by the expert management system can be independent persons having expertise in one or more topics. For example, an expert in a cellular telephone service may be an experienced user or a current/former employee of a telephone company. The plurality of experts forms a support and/or service community having a diverse range of expertise. Communication with experts may be via the internet and/or other communication service. For example, an expert may provide customer service via a personal computer, tablet computer, or cellular telephone. Communication between a requester and an expert can be via telephone, voice over Internet Protocol (VoIP), text session, video, e-mail, chat, Facetime®, mobile application, etc. Both requesters and experts are examples of "users" of the system.

Experts may be compensated via a variety of methods. In some embodiments, a person making the inquiry for service posts a reward. In some embodiments, a tip is paid to the expert by the person making the inquiry after an answer is provided. In some embodiments, an enterprise pays or provides funds for paying experts to resolve service inquiries, optionally before the inquiries reach a contact center. For example, a utility company may designate funds to be paid to experts that prevent calls from reaching the utility company's contact center, or paid to experts for working on inquiries initially submitted to the contact center.

Certain terms are defined herein to have specific meanings. As these terms are used herein in the specification and claims, these terms are meant to be inherently limited by the definitions provided. Specifically, as used herein:

A "customer service inquiry" is defined as a request for help, assistance, support or some other type of service. Customer service inquiries can include technical service, sales service, advice, reviews, geographic directions, assembly directions, customer service and/or the like. Customer service inquiries may originate from an individual or a business that wishes to know about, consumes or potentially consumes a product or service. Customer service inquiries are sometimes referred to herein as "service inquiries" or simply "inquiries" where the context is clearly referring to customer service inquiries. Inquiries may be requests for services or information.

A "requester" is a person or enterprise that submits a customer service inquiry using a communication device.

An "expert" is defined as a person that makes him or herself available to provide responses (e.g., answers) to customer service inquiries. Experts can have different specialty characteristics, which denote topics in which the expert has expertise. In some embodiments, experts may have different levels of certification. For example, a "certified expert" may be one that is acknowledged by an enterprise to have specialty characteristics in the activities of that enterprise. In one embodiment, an airline certifies outside experts as having specialty characteristics in the airline's reservation system. A certified expert may be certified on the basis of having passed a test such as a language test or a technical skill test, and/or on the basis of having completed specific training. These experts may be former employees of the airline and/or have been trained by the airline. An internal expert is an enterprise employee or some other person that is provided with access to customer and/or account information that is generally not public. For example, if an enterprise is a bank, then an internal expert may be a contractor to whom the bank has given access to selected customer account information.

A "contact center" is defined as a facility populated by service personnel consisting of employees of an enterprise or employees of contractors to the enterprise for the purpose of responding to customer service inquiries. Contact centers may support one or more specific enterprise and normally have a set number of service personnel available to answer service inquiries at any given time. Contact centers may communicate with requesters by phone, chat, text and/or e-mail. The service personnel of a contact center are directly or indirectly under the control of an enterprise that pays for the service personnel to answer service inquiries and control the contents of the answers provided. One example of a contact center is a traditional call center.

An "enterprise" is defined as a business or other organization that would normally receive customer service inquiries relating to products or services of the enterprise. Examples of enterprises include corporations, product and service companies, professional organizations, political organizations, unions, non-profits, and/or academic or scientific institutions. Enterprises may have their own contact centers or may contract contact center services from third parties. In either case, the enterprises typically have control over the activities over contact center personnel. For example, the Enterprise will define answers to be given to specific questions.

An "answer" is the content of a response to a customer service inquiry and is intended to resolve the inquiry, ask for explanation or further details of the inquiry, and/or provide the requester with options relating to resolution of the inquiry.

A "partial response" is a response to be modified and/or approved by a human expert. Partial responses can include, for example, templates for answers, suggested answer contents, answers that require filtering of personal information, answer outlines, answer suggestions, and/or the like. A partial answer includes an answer that requires further action by a human agent. For example, a partial response may be approved, edited, and/or otherwise modified by a human expert prior to being provided to a requestor. In contrast, a "complete response" is a response ready to be provided to a source of a customer service inquiry.

FIG. 1 illustrates a Customer Service Architecture 100, according to various embodiments of the invention. Customer Service Architecture 100 includes an Expert Management System 105 configured to communicate with a plurality of Client Devices 110 and a plurality of Expert Devices 115 via a Network 120. Client Devices 110 and Expert Devices 115 are individually referenced as A, B, C, etc. The numbers of Client Devices 110 and Expert Devices 115 illustrated in FIG. 1 are for illustrative purposes; typically Customer Service Architecture 100 is configured to service much larger numbers of Client Devices 110 and Expert Devices 115. Expert Management System 105 is optionally further configured to communicate with a Contact Center 125 and/or an Enterprise 130. These communications are optionally via Network 120.

Client Devices 110 are the communication devices of a person sending a customer service inquiry. These communication devices can include, for example, a personal computer, a telephone, a cellular telephone, a tablet computer, a vending device, an interactive advertisement, a terminal, a point of sale system, a kiosk, and/or the like. Client Devices 110 enable communication modes such as voice, text, e-mail, video, MMS (multi-media messaging), and/or the like. Client Devices 110 are optionally configured to communicate through a web browser. Client Devices 110 optionally include an application specifically configured for communicating with Expert Management System 105 and/or Contact Center 125.

Expert Devices 115 are the communication devices of experts. Expert Devices 115 can include the same types of devices as discussed herein with respect to Client Devices 110. In some embodiments, an expert may have a plurality of different devices the expert uses to response to customer service inquiries. For example, one expert may use a personal computer, a tablet computer and a cellular phone to communicate with Clients 110 and/or Expert Management System 105. Expert Devices 115 optionally use a browser or custom application for this communication.

Network 120 is a communication network such as the internet, a wide area network, a cellular network, a telephone network (POTS), a satellite network, a cable network, and/or the like. Network 120 may include wired and wireless segments.

Expert Management System 105 includes a Request I/O 135 configured to receive customer service inquiries and communicate with Contact Center 125, Client Devices 110 and Expert Devices 115. Request I/O 135 may include a plurality of different devices, such as routers, firewalls, Ethernet ports, gatekeepers, switches, and/or the like. Request I/O 135 is configured to communicate via Network 120 and is typically configured to communicate via TCP/IP protocols. Request I/O 135 is optionally configured to communicate over a secure (e.g., encrypted) communication channel. The customer support inquires received via Request I/O 135 may be received at a data warehouse form an ETL (Extract, Transform and Load) process, or alternatively received from a customer support export queue of Call Center 125.

Expert Management System 105 optionally further includes an Inquiry Storage 137. Inquiry Storage 137 includes memory such as RAM, SRAM, a hard drive, flash memory, an optical drive, etc. Inquiry Storage 137 optionally further includes data structures specifically configured to store customer support inquires. This data structure may be part of a database and/or data warehouse.

Expert Management System 105 further includes an Inquiry Parser 140 configured to parse received customer service inquiries. Inquiry Parser 140 includes computer implemented logic configured to automatically parse each customer service inquiry and determine one or more topic characteristics of the inquiry, without human analysis. Inquiry Parser 140 includes hardware, firmware and/or software stored on a non-transient computer readable medium. Topic characteristics are characteristics of the service inquiry that are indicative of the topic(s) of the service inquiry. For example, topic characteristics may include information regarding a source of the service inquiry, metadata characterizing text within the service inquiry, account information, keywords within the service inquiry, and/or the like. Examples of topic characteristics include questions regarding specific software or hardware, business services, reservations, bill payment, account services, how to do something, medical questions, installation procedures, advice, appointments, professional recommendations, etc.

In some embodiments, Inquiry Parser 140 is configured to identify a source of the customer service inquiry and to infer topic characteristics of the service inquiry based on the identity of the source. For example, if a service inquiry arises from a member of Client Devices 110 that includes a kiosk in a retail store of a cellular telephone company, then Inquiry Parser 140 can infer that the topic of the customer service inquiry is related to the cellular telephone company. In another example, if the customer service inquiry is received from a webpage hosted by an electronics retailer, then Inquiry Parser 140 can infer that the topic of the customer service inquiry is related to the products of the electronics retailer, or to a specific product displayed on the webpage. In some embodiments, Inquiry Parser 140 is configured to use a location of a member of Client Devices 110 as a topic characteristic. For example, if the customer service inquiry is received from Client Device 110A while Client Device 110A is located at a national park, then Inquiry Parser 140 can infer that the topic of the inquiry related to that park. Inquiry Parser 140 is optionally configured to use a universal resource locator (URL), internet domain, account, browser type, application type, and/or similar information regarding the customer service inquiry. For example, Inquiry Parser 140 may use the identity of a web page or mobile application from which a customer service inquiry was received to select a natural language processing lexicon to be used in identifying topic characteristics of the inquiry.

Inquiry Parser 140 optionally includes a natural language processing engine to determine one or more topic characteristics of a customer service inquiry. A lexicon used by the natural language processing engine may be selected based on a source of the customer service inquiry. The natural language processing engine is optionally configured to detect and interpret phrases as well as key words and phrases that pertain to the industry (i.e., "wireless"), company (i.e., "Verizon"), location (i.e., "California"), topic (i.e., "Downloading music"), device (i.e., "iPhone"), etc.

In some embodiments, Inquiry Parser 140 is configured to identify metadata within a customer service inquiry and to assign particular meaning to data tagged by the metadata. For example, if the customer service inquiry is generated in Client Device 110B using a browser, the inquiry may include data entered in specific fields of a webpage configured to receive keywords such as model number, brands, serial numbers, topic identifiers, account numbers, login data, etc. The inquiry may include data characterizing a customer profile, a device type of Client Device 110B, a browser identity, an operating system identity, a source Universal Resource Locator (URL), a source Internet Protocol (IP) address, a source MAC address, a password, a security token or certificate, and/or the like.

The location of an expert may be considered in determining if an expert is available to respond to a specific inquiry, when a specific location facilitates responding to the inquiry. For example, if a customer wishes advice on places to visit within a city the inquiry may specify an expert local to the city. The language of an expert may be considered in determining if an expert is available to respond to a specific inquiry. For example, an inquiry may require communication in a specific language or translation between languages.

In some embodiments, Expert Management System 105 is configured to receive and store an availability schedule from an expert. The availability schedule includes time during which the expert is available, unavailable and/or on standby. The condition of standby indicates that the expert is not currently available but could become available upon request. For example, an expert may be may be moved from a standby state to an available state in response to real-time demand. The change in state optionally includes sending a message to a device of the expert, e.g., Expert Device 115A, asking that the expert make ready to respond to inquiries in real-time. As demand changes, the expert may be placed back on standby. Such changes are may be on a relatively short time scale, e.g., less than 10, 30 or 60 minutes, and are optionally not associated with a traditional multi-hour work shift. This allows the system to respond to changes in demand in real-time. In one illustrative example, an airline stewardess trained in reservations may be moved from a standby to an available status for a short time between flights, in response to a high demand. Moving from standby to active optionally includes moving the expert from a queue of experts on standby.

In typical embodiments, an expert is assigned one or more scores. Expert scores are based on one or more of the following: a) time taken to provide an initial response to customer service inquiries, b) time taken to resolve customer service inquiries, c) feedback from requesters of customer service inquiries, d) ratings by fellow experts, and e) cooperation with fellow experts. For example, in some embodiments, a person making a customer service inquiry is asked to rate the quality of the response received from a particular expert. The quality can include factors such as speed of response, helpfulness, etc. In some embodiments, a fraction of responses to customer service inquiries made by an expert are sent to fellow experts for their review of the quality of the responses. The score of an expert can be based on both requester and fellow expert ratings.

Cooperation with fellow experts includes working with fellow experts to respond to a customer service inquiry, and referring customer service inquiries to other experts. A single customer service inquiry may be resolved by more than one expert in cooperation. For example, a problem involving a computer and a software application may be cooperatively solved by an expert having expertise on the computer and an expert having expertise on the software application. A first expert may refer a customer service inquiry to a second expert if the inquiry would be better resolved by the second expert. For example, if a first expert on airline reservations receives a customer service inquiry that would be better handled by a second expert on frequent flyer programs, then the first expert may forward the inquiry to the second expert. If, as optionally determined by the second expert, the forwarding was appropriate; the first expert may be rewarded by an improvement in expert score.

An expert score may include a general component and a component that is specific to different topics. Thus, and expert might have a better score in one topic relative to another topic. An expert may have a high score in motorcycle maintenance and a low score in computer networking.

In some embodiments experts are classified, e.g. as "internal experts" and "external experts." Generally, an internal expert is an expert that is under the control of an organization such as Enterprise 130. Examples of internal experts include call center (e.g., Contact Center 125) staff, retired employees, off-duty employees, and/or the like. Generally, an external expert is an expert that is not under direct control of the organization. An external expert may be compensated based on posted rewards, which may be specific to a particular customer service inquiry. In contrast internal experts are more likely to be compensated at a fixed rate ($/answer or $/hr). Thus, internal and external experts may receive different rewards for answering a customer service inquiry.

Typically, internal experts are authorized to receive a greater amount of customer information relative to external experts. For example, internal experts may be authorized to access confidential financial data, account numbers, social security numbers, medical information, order history, customer data (telephone number, address, name, etc.), and/or the like, while external experts are not thus authorized. Internal experts may also be authorized to take actions for which external experts are not authorized. For example, an internal expert may be authorized to give a customer credit, to authorize a payment, to make a reservation, to accept an order, to electronically access a customer's device, and/or the like. The classification of experts need not be binary. For example, there can be multiple levels of expert authorization and/or capabilities. The authorization of an expert may be specified by an organization (e.g., Enterprise 130) to whom a customer service inquiry is directed, or may be specified by a third party certification process. Such authorization may be made based on training and/or certification of the expert.

Expert Management System 105 optionally further includes Cluster Detection Logic 127. Cluster Detection Logic 127 is configured to determine if a customer service request is a member of a cluster of customer service requests. "Clusters" are groups of customer service inquiries having similar topics and/or requiring similar responses. For example, a cluster of customer service inquiries may all bel associated with a password change or with an account balance request. The information used to determine if a particular customer service inquiry is a member of a cluster includes, for example, a source of the customer service inquiry, images within the customer service inquiry, metadata associated with the customer service inquiry, and/or text within the customer service inquiry. In addition, Cluster Detection Logic 127 optionally attempts to obtain a greater understanding of the content a customer service inquiry, relative to Inquiry Parser 140. For example, Cluster Detection Logic 127 may employ a natural language processor to obtain a more accurate understanding of the text within a customer service inquiry.

Cluster Detection Logic 127 can include a trained machine learning system, e.g., a neural network or artificial intelligence system. This machine learning system is optionally trained using prior inquiries and responses as described elsewhere herein. In some embodiments, Cluster Detection Logic 127 is configured to identify new clusters in which customer service inquiries can be included. This identification can be based on customer service inquiries and/or responses to these inquiries. For example, if a number of inquiry responses include instructions on cancelling a reservation or subscription, then Cluster Detection Logic 127 may examine the customer service inquires that resulted in these inquiry responses and identify characteristics of the inquiries that can be used to categorize them into a cluster. In some embodiments, a new cluster identified by Cluster Detection Logic 127 must be approved by an internal or external expert prior to use in classifying additional customer service inquiries.

Expert Management System 105 further includes Matching Logic 155 configured to match customer service inquiries to human experts. The matching is optionally based on at least a score of one of the human experts and a correlation between the topic characteristics of the inquiry (e.g., as determined by Inquiry Parser 140) and the specialty characteristics of the human expert. The expert score considered in matching is optionally specific to the topic characteristics and/or cluster of the inquiry. For example, an expert may have a plurality of scores associated with different clusters of customer service inquiries, e.g., relatively higher scores related to computer networking as compared to spider identification. As such the matching performed by Matching Logic 115 can be dependent on assignment of customer service inquires to particular clusters. Expert Management System 105 is optionally further configured to match inquiries and experts based on the availability of the experts. For example, if a customer service inquiry is to be resolved in real-time, then only those experts currently available are considered for matching. Matching Logic 155 may be configured to match inquiries to internal and/or external experts.

Matching Logic 155 is optionally configured to match a plurality of experts to a customer service inquiry. These experts may be ranked, for example, in order from best match to less favorable match. As is described further elsewhere herein, the customer service inquiry may be initially offered to the first ranked expert, and if not resolved later offered to a second ranked expert. In some embodiments, a requester can choose between two or more matched experts, or can select a plurality of experts to answer an inquiry in parallel.

In various embodiments, Matching Logic 155 is configured to match the inquiry based on a request for a specific human expert (e.g., an expert used by the requester in the past), to match based on a topic characteristic identified by a second human expert, and/or to match based on a referral by a second human expert. In some embodiments, Matching Logic 155 is configured to match the customer service inquiry to a second human expert based on an unsatisfactory answer received from the first human expert. In some embodiments, Matching Logic 155 is configured to match the inquiry to internal or certified experts from different third parties in parallel (e.g., based on two or more different topics characteristics of the customer service inquiry matching complementary specialty characteristics of the experts).

Expert Management System 105 further includes Scoring Logic 160 configured to calculate expert scores and to associate these scores with the corresponding experts. As discussed elsewhere herein, scores are based, for example, on the historical performance of an expert. Typically, the data used to calculate the score for an expert include both feedback from other experts and feedback from customers whose customer service inquiries have been handled by the expert. Scores may be specific to specific topics. As such one expert may have several different expert scores for different topics (specialty characteristics). Scores are optionally further calculated based on certification and/or official status of an expert. In some embodiments, Scoring Logic 160 is configured to calculate scores for groups of experts, such as expert teams.

Expert Management System 105 further includes Routing Logic 165 configured to route customer service inquiries to experts matched to the inquiries by Matching Logic 155. In some embodiments, Routing Logic 165 is configured to route the customer service inquiry to one of Expert Devices 115 and then further communication related to resolution of the inquiry occurs directly between the one of Expert Devices 115 and the originating member of Client Devices 105 (e.g., the member of Client Devices from which the inquiry originated). In some embodiments, Routing Logic 165 is configured to route the customer service inquiry to one of Expert Devices 155 and then route a response from the one of Expert Devices 115 back to the originating member of Client Devices 105. In these embodiments, Routing Logic 165 may route multiple communications between these devices to resolve a customer service inquiry.

In various embodiments, Routing Logic 165 is configured to route customer service inquiries to more than one expert (associated with more than one of Expert Devices 115). This can occur in various ways. For example, a customer service inquiry may be routed to different experts in a serial manner if a first expert, or set of experts, is unable to provide a satisfactory resolution for a customer service inquiry. The lack of a satisfactory resolution may be determined by the originator of the inquiry (requester) and/or by an elapsed time. A customer service inquiry may be routed to different experts in a serial manner if a first expert (or set of experts) refers the inquiry to a second expert. The second expert may take over responsibility for resolving the inquiry alone, or may work with the first expert to jointly resolve the inquiry. In one example, a response(s) produced by one set of experts may be given to a second set of experts for rating or to provide further input. Optionally, separate responses to an inquiry are provided by different sets (e.g., teams or groups) of experts.

In various embodiments, Routing Logic 165 is configured to route a customer service inquiry to more than one expert in parallel. As used herein, "parallel" routing means that the customer service inquiry is sent to a second expert without regard to whether a response (to the same inquiry) has been received from a first expert. This approach is optionally used to assure that at least one expert responds to the inquiry in a timely manner. For example, a customer service inquiry may be routed in parallel to several different experts identified by Matching Logic 155. The expert that responds first to the inquiry is then optionally assigned responsibility for responding to the inquiry, and the opportunity to respond to the inquiry is then typically withdrawn from other experts. In some embodiments, multiple customer service inquiries are sent to one expert and the expert has the opportunity to select which one he or she is best suited to respond to. In some embodiments, an inquiry is presented to multiple experts in parallel and one or more of these experts can respond to the inquiry. The multiple experts may be notified of more than one inquiry in parallel and each of the experts can then choose which one (or more) of the inquiries to respond to.

Routing Logic 165 is optionally configured to route customer service inquiries to Contact Center 125. This can occur, for example, if an expert refers the service inquiry to Contact Center 125, if an expert is unable to resolve an inquiry to a requester's satisfaction, if an inquiry is not resolved within a predetermined time period, if no expert having needed specialty characteristics is available, if topic characteristics of the inquiry require confidential account data not available to experts, and/or the like. In some embodiments, Routing Logic 165 is configured to route a customer service inquiry to Contact Center 125 if Enterprise 130 reports that there are currently unused service personnel at Contact Center 125. For example, if Enterprise 130 has an instance of Contact Center 125 including 30 service personnel that represent a sunk cost, then Enterprise 130 may wish to use these personnel rather than pay a cost of having the customer service inquiry sent to one of Expert Devices 115. Likewise, Routing Logic 165 may be configured to avoid routing customer service inquiries to Contact Center 125 at time that Enterprise 130 reports that no contact center service personnel are available. Routing Logic 165 may be configured to avoid routing customer service inquiries to Contact Center 125 that are originally received from requestors via Contact Center 125.

In some embodiments, Routing Logic 165 (or Matching Logic 155) is configured to consider a customer service inquiry (including content, requester profile, requester activity, expert activity, etc.) and three possible resource types to resolve the inquiry. The resource types can include 1) Automated answers, external experts and internal experts. Routing Logic 165 or Matching Logic 155 is optionally configured to determine which types are most useful/efficiently used. This determination can rely on either binary rules: i.e., don't use community members for password questions, don't use automated responses if the questions has high emotional context; or by probabilistic rules: i.e. use an automated response if confidence >90%, or use a community member (external expert) if they've successfully answered over 50% of questions that look like this. The resources used to resolve a customer service inquiry can include more than one resource type. For example, all three types of resources may be used serially or in parallel. As is discussed elsewhere herein, the three types of resources may use a common communication channel and/or user interface.

In some embodiments, the ability of an expert to resolve a customer service inquiry can be determined by the requester and/or the expert. A requester may indicate that he or she is unsatisfied with a response provided by an expert and ask that the customer service inquiry be forwarded to Contact Center 125. An expert may determine that he or she is unable to properly respond to a customer service inquiry. The inability to properly respond may be, for example, because the inquiry has been improperly or incompletely characterized by Inquiry Parser 140, because the expert is not qualified, because confidential information (e.g., account access) is required, and/or because there is no resolution to the inquiry. In various embodiments, if an expert is unable to respond to an inquiry the requester may forward the inquiry to Contact Center 125 and/or to another requester. In some embodiments, Routing Logic 165 is configured to automatically send a customer service inquiry to an internal expert if an external expert is unable to provide an adequate answer to the inquiry.

In some embodiments, Routing Logic 165 is configured to prevent routing of customer service inquires including confidential information to external experts. For example, inquires including an account number, social security number, telephone number, or any of the other personal/private information discussed herein, are optionally always routed to an internal expert. Inquiry Parser 140 is optionally configured to identify which customer service inquiries are likely to require the use of confidential information and Routing Logic 165 can then route those inquires to internal experts. For example, an inquiry that requests a change in mailing address or customer authentication may be directed to internal experts rather than external experts.

In some embodiments, Routing Logic 165 is configured to give priority to internal experts and then to route customer service inquiries to external experts when no internal experts are available. Matching Logic 155 may select specific internal and external experts, for routing an inquiry, using the same or different criteria.

In some embodiments, Matching Logic 155 is configured to match customer services requests an Automated Response Logic 190. Automated Response Logic 190 is configured to provide at least part of a response without further human intervention, e.g. to provide an "automated response." Automated Response Logic 190 is discussed elsewhere herein. Customer service inquiries may be routed to Automated Response Logic 190 in series or in parallel to internal and/or external experts. Once matched to Automated Response Logic 190, inquires can be routed to Automated Response Logic 190 by Routing Logic 165.

Matching Logic 155 may be configured to match a customer service inquiry to Automated Response Logic 190 based on availability of internal experts, availability of external experts, an estimate that the Automated Response Logic 190 can contribute to a helpful response, and/or the like. For example, a lack of internal and/or external experts may increase the likelihood that a particular customer service inquiry is matched and subsequently routed to Automated Response Logic 190. As with matching to particular internal and/or external experts, matching to Automated Response Logic 190 can also be based on one or more topic characteristics of the customer service inquiry, optionally as determined by Inquiry Parser 140.

In some embodiments, Matching Logic 155 is configured to analyze detailed contents of a customer service inquiry to determine that the request should be matched and routed to Automated Response Logic 190. This determination may be based on a calculated probability of a satisfactory response to the request and/or an expected score of response the response. The determination may also be based on an estimate that a partial response to the service inquiry will facilitate a full response made by a human expert. For example, Automated Response Logic 190 may be configured to provide a template and/or suggested sentences (a partial response) to an internal and/or external expert. The expert(s) may then modify the partial response by editing, adding appropriate details, removing parts, and/or the like. In some cases, a human expert merely approves a response provided by Automated Response Logic 190.

Matching Logic 155 and/or Routing Logic 165 optionally includes a machine learning system, e.g., a neural network or artificial intelligence system, configured to match and/or route customer service inquiries. As used herein, "machine learning system" is meant to include actual machine learning systems and/or other types of Bayesian/neural network/artificial intelligence systems. The machine learning system can include hardware, firmware, and/or software stored on a computer readable medium, and is optionally configured to be trained using training data to produce desired functionality. These requests may be routed to internal experts, external experts, automatic response systems (e.g., Automated Response Logic 190), or any combination thereof. A trained machine learning system may include parts specific to a particular Enterprise 130, parts specific to particular request topics, and/or more general parts. The machine learning system may be trained to receive contents of (and/or metadata associated with) a customer service inquiry and to determine if Automated Response Logic 190 should receive the request. The machine learning system may output an estimated response score, a Boolean determination, a probability, the identity of a preferred Automated Response Logic 190, and/or the like.

Expert Management System 105 further includes a Routing Data Storage 170 configured to store logs of inquiry routing. Routing Data Storage 170 includes non-transitory memory specifically configured to store information relating to current and/or past routing. The memory is thus configured via data and file structures. For example, Routing Data Storage 170 can include an expert relational database in which data structures are defined to store routing data. The stored routing data includes information such as which Expert Devices 115 received customer service inquiries from which Client Devices 110, how many inquiries were routed, the source and destination of any answers to these inquiries, how many answers were routed, which experts forwarded inquiries, where the inquiries were forwarded to, and/or the like. In some embodiments, routing data storage is configured to store logs of customer service inquiries that were routed to more than one human expert (in parallel and/or serially) and/or inquiries that were routed to Contact Center 125.

In some embodiments, content from Automated Response Logic 190, internal experts, and/or external experts is presented to customers within a first chat window on Client Device 110A, and/or also within a second chat window on Expert Device 115A (used by an external expert, and/or also on Expert Device 115B (used by an internal expert). In these cases, Filtering Logic 117 may be configured to selectively filter the content presented on the different devices. For example, the most personal information, such as social security numbers, may only be seen by the customer, and personal information such as account balances and personal address may only be seen by the customer and internal expert. Filtering logic can remove personal private information from a version of the multi-party conversation seen by the external expert and/or internal expert.

In some embodiments, Expert Management System 105 further comprises Reward Logic 180 configured to provide a reward an expert as consideration for providing one or more answers to a customer service inquiry. This reward is optionally a monetary reward and may be in a virtual currency. The reward is typically paid to an account of an expert. In some embodiments, the reward is specified by Enterprise 130. For example, Enterprise 130 may provide a predetermined monetary reward for each customer service inquiry resolved by experts via Expert Management System 105. Enterprise 130 may specify a budget for resolving customer service inquiry and Reward Logic 180 may be configured to provide rewards to experts based on this budget. The amounts of rewards received by experts is optionally dependent on the rating of the response by the requester and/or other experts, dependent on the topic characteristics of the inquiry, on the amount of time and/or number of experts that contributed to the response, on the score of the expert, on the response time of the expert, on whether the customer service was forwarded (and whom it was forwarded to), on contact center capacity and utilization, on time of day, on time of year, etc. In some embodiments, Reward Logic 180 is configured to split rewards between collaborating experts. An expert may share in a reward as a result of a referral and/or collaboration. Thus, an expert may be entitled to a reward for any contribution to the workflow related to customer service inquiries, or similar tasks. In an illustrative embodiment, an external expert may be rewarded for modifying and/or merely approving draft answers for used by Automated Response Logic 190. Reward Logic 180 is typically configured to track relative contributions of individual experts to an automated response, and to track performance (use and scoring) of the automated response. Examples of agent contributions include wording of complete and/or partial responses and tasks that contribute explicitly and/or implicitly to the training of a neural network/machine learning system/artificial intelligence system that serves automated responses, such as rating and reviewing past interactions between users and the automated responses, reviewing and approving clusters of frequently asked questions suggested by the machine learning/artificial intelligence system, etc.

In some embodiments, Reward Logic 180 is configured to provide a reward specified by the source of a customer service inquiry. For example, a requester may designate a reward amount prior to the inquiry being routed to an expert or may designate, after the inquiry is resolved, a reward (tip) to be paid to the expert that resolved the inquiry by providing a satisfactory answer. In some embodiments, experts can bid to receive customer service inquiries, the result of the bidding being based on the lowest bid and/or the experts' scores. For example, the expert willing to be paid the lowest amount (as normalized by expert score) to resolve the inquiry is considered the bidding winner. The winner of the bidding, as determined by Reward Logic 180, receives the customer service inquiry.

Reward Logic 180 is optionally configured to provided rewards related to Automated Response Logic 190. In various embodiment, these rewards are provided when an external expert's answer is used to train an artificial intelligence system (or other type of machine learning system), and/or when content from the external expert's answer is reused by Automated Response Logic 190. For example, if a response receives a particularly high score (as determined by Scoring Logic 160) then that response may be used to train a machine learning system included in Automated Response Logic 190. Such use may justify that a reward be provided to the human expert that first generated the response. Rewards can include publicity, cash, credits, non-profit donations, and/or any other consideration. Rewards may be provided for tasks that contribute explicitly and/or implicitly to training of the neural network/machine learning system/artificial intelligence system. Also, Reward Logic 180 may distribute these rewards based on experts' relative contribution to performance of automated responses.

In another example, wording from a human expert's answer that scores well may be adapted by Automated Response Logic 190 for inclusion in an answer that is later provided as part of an automated response. Specifically, an expert's answer may be reused verbatim by Automated Response Logic 190, may be adapted to generate a response template by Automated Response Logic 190, and/or may have specific wording extracted for use in an automated response. The expert may receive a reward for such contributions.

Contented provided by more than one human expert may be used to generate at least a partial response to a customer service inquiry. In such a case, rewards provide by Reward Logic 180 are optionally prorated among the experts based on their relative contributions, e.g., the fraction of an automated response that includes each experts' contribution. Rewards based on use by Automated Response Logic 180 are optionally prorated based on a time elapsed since the used content was first provided by a human expert. Typically, content that was provided on a more distant date would be entitled to a lower reward. Rewards are optionally based on both a score calculated using Score Logic 160 and reuse of content by Automated Response Logic 190.

In some embodiments, Expert Management System 105 further comprises a Response Log Storage 185. Response Log Storage 185 includes non-transitory memory specifically configured to store responses to customer service inquiries, including responses provided by experts. The memory is thus configured via data and file structures. For example, Response Log Storage 185 can include a relational database including data records configured to store responses in a chronological order. The data records may be configured to store a conversation between a requester and one or more expert wherein each party provides content in the form or audio, text and/or video.

In some embodiments, some or all responses stored in Response Log Storage 185 are available to a requester on a historical basis, e.g., the requester can review a history of responses provided to the requester and/or responses provided to other requesters. In some embodiments some or all responses stored in Response Log Storage 185 are available to experts, other than the experts that provided the responses. For example, responses may be made available to experts for the purpose of rating the responses, and/or to facilitate the use of the stored responses to respond to further customer service inquiries. In some embodiments, an expert may be rewarded (e.g., given a higher score) for providing a response that is used by other experts to resolve other customer service inquiries. In some embodiments, responses stored in Response Log Storage 185 are provided to Enterprise 130 such that Enterprise 130 can improve the knowledge base used by Contact Center 125.

Expert Management System 105 optionally further includes Acceptance Logic 157. Acceptance Logic 167 is configured to accept a subset of received customer service inquires for processing by one or more external experts and/or by Automated Response Logic 190, e.g., by a first human expert and a trained machine learning system. The acceptance may be based on availability of the first human expert and predicted probabilities that the first human expert will be able to resolve each member of the subset of inquiries. Typically, Acceptance Logic 167 is configured to consider the probabilities that any one or combination multiple external human experts will be able to resolve each customer service inquiry. Resolution of a customer service inquiry may require a predicted response score of a predetermined level.

The probability that a customer service inquiry can be resolved is optionally determined in real-time as customer service inquiries are received. In some embodiments, Acceptance Logic 157 is configured to compare an estimated probability of resolution for each of the inquires to a threshold probability. Customer service inquiries that are not accepted are optionally directed to Contact Center 125.

Expert Management System 105 optionally further includes Training Logic 147. Training Logic 147 is configured to train an artificial intelligence system and/or other machine learning systems, including those that are optionally included in Automated Response Logic 190, Acceptance Logic 157, Specialty Discovery Logic 187, Cluster Detection Logic 127, Matching Logic 155, Inquiry Parser 140, and/or Routing Logic 165. Training Logic 147 is configured to train these machine learning systems based on customer service inquiries, responses to these customer service inquiries, and/or scores generated using Scoring Logic 160 and associated with respective member if the responses.

Specifically, Training Logic 147 is optionally used to train a machine learning system of Acceptance Logic 157, the machine learning system being configured to determine if a particular customer service inquiry should be accepted by Expert Management System (or alternatively directed to a Contact Center 125 associated with Enterprise 130). Such training can be based on scores generated by Scoring Logic 160 for responses generated by Expert Management System 105 and optionally scores for responses generated from answers generated by Contact Center 125.

Training Logic 147 is optionally used to train a machine learning system of Routing Logic 165 that is configured to determine if a customer service inquiry should be routed to both Automated Response Logic 190 and one or more human experts; routed to Automated Response Logic 190 or (alternatively) one or more human experts; routed to an internal expert and/or an external expert; routed to multiple human experts; routed to a specific human expert; and/or any combination thereof.

Training Logic 147 is optionally used to train a machine learning system of Automated Response Logic 190 that is configured to provide an "automated response" including at least a partial response to a customer service inquiry. Such training may result in the generation of Automated Response Data 195 that includes wording originally provided by an internal or external expert in response to a customer service inquiry; further such wording may be combined by Training Logic 147 and/or Automated Response Logic 190 to generate new responses to future customer service inquiries. Training Logic 147 is optionally configured to train this machine learning system to select specific response templates, to select suggested content, and/or the like, for inclusion in at least a partial response. Further, Training Logic 147 is optionally configured to train this machine learning system to select a complete response to be provided to a source of a customer service inquiry without further human input.

Any of the machine learning systems within Expert Management System 105 may be trained based on scores determined using Scoring Logic 160 as described elsewhere herein. Such training is optionally ongoing. For example, a trained machine learning system may be further refined as additional customer service inquiries are received and resulting responses are scored. Further, the training can be based on any of the characteristics of a customer service inquiry. For example, Training Logic 147 may use metadata associated with an inquiry, an identity of a source of the inquiry, an identity of an Enterprise 130 to whom the inquiry is directed, a communication channel (e.g., internet, chat, phone, etc.) over which the inquiry is received, an inquiry history, characteristics of specific human experts, inquiry contents (e.g., text or images), time of day/date, and/or the like. Training Logic 147 includes hardware, firmware, and/or software statically stored on a computer readable medium.

In some embodiments Expert Management System 105 further comprises Specialty Discovery Logic 187. Specialty Discovery Logic 187 is configured to identify one or more specialty characteristics of experts using Expert Devices 115. The identified specialties are optionally in addition to specialties that are self-declared by each expert. The identification is based on customer service inquiries answered by each of the experts and/or based on answers to the customer service inquiries provided by each of the experts. Matching Logic 155 is optionally further configured to match an inquiry to a human expert based on specialties identified by Specialty Discovery Logic 187 (optionally in addition to considering expert scores). Specialty Discovery Logic 187 includes hardware, firmware, and/or software store on a non-transient computer readable medium. In some embodiments Specialty Discovery Logic 187 includes a trained machine learning system. This machine learning system is optionally trained using customer service inquiries, responses generated by human experts (and/or automated response logic), and/or response scores produced by Scoring Logic 160.

In some embodiments, Specialty Discovery Logic 187 is configured to parse answers provided by an expert and to note topics included in these answers. For example, if an expert provides a number of answers that include discussion of wireless networks, the Specialty Discovery Logic 187 may identify wireless networks as a specialty of that expert. Specialty Discovery Logic 187 may take into account reviews (e.g., scores) of an expert's answers. For example, if an expert receives good (e.g., highly rated) reviews for answers related to cable television service, then Specialty Discovery Logic 187 may identify cable television as a specialty of that expert. Likewise, if an expert receives poor reviews for answers related to mountain bikes then the expert may not be considered to have a specialty on this subject, even if the expert attempts to self-declare expertise in the subject. The reviews may be from customers and/or other experts.

In some embodiments, expert's answers to customer service inquiries and/or expert's comments are placed in a FAQ bulletin board or discussion board. In these embodiments, voting (up or down) of an expert's answer and/or comment may be used in determining specialties of an expert. A specialty of an expert may or may not be a Boolean value. For example, expertise can be on a scale from −5 to +10.

In some embodiments Specialty Discovery Logic 187 is configured to parse customer service inquires answered by an expert and to note topics included in these inquiries. For example, if an expert frequently chooses to answer inquires relating to automotive repair then Specialty Discovery Logic 187 may determine that the expert has a specialty in the field of automotive repair. Specialty Discovery Logic 187 may consider both the content of inquiries answered the content of the resulting answers.

In some embodiments, Specialty Discovery Logic 187 includes a Natural Language Processing (NLP) and/or Natural Language Understanding (NLU) system configured to identify topics of answers and inquires. Alternatively, Inquiry Parser 140 may be used to identify these topics. In some embodiments, Specialty Discovery Logic 187 is configured to identify specific terms in requests and/or answers. The specific terms may be predetermined or may be determined by analysis of many answers and/or requests, and noting that identified specific terms and/or specialties can be used to classify experts and inquires.

In some embodiments, Expert Management System 105 further comprises Automated Response Logic 190. Automated Response Logic 190 includes hardware, firmware and/or software statically stored on a computer readable medium. Automated Response Logic 190 is configured to generate an automated response to a customer service inquiry. As used herein, an "automated response" is a response that is generated automatically by computer, e.g., without a need for real-time human input. Typically, an automated response is provided as an attempt to resolve a customer service inquiry prior to forwarding the inquiry to a human expert. For example, Routing Logic 165 may be configured to route a customer service inquiry to one of Expert Devices 115 only if the automated response does not satisfy the requester of the customer service inquiry.

As noted herein, Automated Response Logic 190 optionally includes an artificial intelligence, neural network, expert system, or other machine learning system. These systems are configured to provide complete and/or partial responses to customer service inquiries based on trained parameters. For example, a machine learning system may be trained to generate coefficients that optimize a desired outcome using training data. In typical embodiments, one desired outcome is responses that result in high scores as determined using Scoring Logic 160. Another possible desired outcome is efficient (e.g., cost effective) use of human experts and computing resources. Training data provided to Training Logic 147 to train machine learning system(s) of Automated Response Logic 190 (or any other logic discussed herein) is optionally selected based on response scores. For example, responses produced by human experts may be divided into subsets having relative higher and lower scores. Those with higher scores typically represent preferred (or affirmative) training data. Those with lower scores may represent negative training data, e.g., training data that represents a less desirable outcome.

The automated response is based on the topic characteristics of the inquiry and includes a pre-determined answer to the inquiry or an answer at least partially constructed in response to the inquiry in real-time. The pre-determined answer to the inquiry optionally includes a re-purposed answer previously provided by an expert to an inquiry from a different source and/or an output of a computer based expert system included in Automated Response Logic 190. In some embodiments, an expert can modify the answer to better answer the customer service inquiry, prior to the answer being sent to the requester. In some embodiments, an automated response is sent to a requester while waiting for one or more expert to provide a manual answer. The one or more expert may modify and/or augment the automated response.

Automated Response Logic 190 is optionally used to send an automated response to customer service inquiries when a human expert is not available to respond. For example, the score of an automated response may be compared with the scores of available experts. If the score of the automated response is better than the expert scores, the automated response may be routed to the requester rather than routing the customer service inquiry to an expert. Alternatively, the automated response may be routed to the expert along with the customer service inquiry. This allows the expert to use the automated response as a basis for a manual response. The expert can provide the automated response to the requester in a modified or unmodified form. Alternatively, an automated response is provided to a requester and the inquiry is also provided to one or more experts for further response.

Responses generated by Automated Response Logic 190 are based on Automated Response Data 195. This data, stored in a non-transient computer readable medium, includes predetermined responses, data that can be used to generate a response in real-time, and/or rules used to determine whether a particular response is appropriate for a particular customer service inquiry. The stored responses are optionally stored in association with quality scores. In some embodiments, Automated Response Logic 190 is configured to score prospective automated responses to a customer service inquiry, the score being based on topic characteristics of the customer service inquiry, prior requester ratings and/or expert ratings of the response. Optionally, only if at least a minimum score is achieved, will the automated response be sent to the source of the customer service inquiry. If the minimum score is not reached the inquiry is optionally just routed to one or more experts as described elsewhere herein. In response to receiving an automated response from Automated Response Logic 190, a requester may indicate that the inquiry has been satisfied or may request additional response from a human expert.

In some embodiments, responses provided by Automated Response Logic 190 are rated in manners similar to those described regarding response provided by experts, as discussed elsewhere herein. As such, an automated response can receive a score that is subsequently used to determine if the automated response should be sent in response to a customer service inquiry. This score is optionally specific to one or more topic characteristics. Scores for automated responses are optionally calculated by Scoring Logic 160 using the systems and methods described elsewhere herein.

FIG. 2 illustrates a method of processing a customer service inquiry, according to various embodiments of the invention. These methods are optionally performed using Expert Management System 105. When a stream of customer service inquires is received from Client Devices 110 the methods of FIG. 2 may be used to determine which of the inquiries should be accepted and processed by Expert Management System 105 and which are better resolved at Contact Center 125 (optionally under control of Enterprise 130).

In a Monitor Status Step 210 the status of a plurality of human experts is monitored. This step is optionally performed using Status Logic 145. The status can include whether a particular human expert is connected to Expert Management System 105 via one of Expert Devices 115, whether the expert is currently engaged in responding to customer service inquiries, the specialty characteristics of available internal and external experts, and/or the like.

In a Receive Stream Step 215 a stream of customer service inquiries is received. These are typically received from Client Devices 110 via Network 120. In some embodiments, some of the customer service inquiries are received from Enterprise 130 and/or Contact Center 125.

In an optional Parse Step 220 each member of the customer service inquiries is parsed. Typically, the parsing is performed using Inquiry Parser 140. The parsing is configured to determine one or more topic characteristics for each of the customer service inquires. The parsing may also be used to identify metadata associated with the customer service inquires.

In an optional Retrieve Step 225 data regarding each of the plurality of experts is retrieved from data storage. The retrieved data can include specialty characteristics, expected rewards, location, communication bandwidth, expert scores, and/or the like, regarding each of the plurality of experts.

In a Calculate Step 230 a probability that each (or any) of the plurality of experts can resolve each of the customer services inquires is calculated. The calculation is optionally based on the topic characteristics of each inquiry, the specialty characteristics of each of the plurality of experts, and/or other data related to the human experts. In some embodiments, Calculate Step 230 includes a calculation of a probability that an automated response system, e.g., Automated Response Logic 190, will be able to answer each of the customer service inquires, respectively.

In an Accept Step 235, a subset of the plurality of inquiries is accepted. In some embodiments, the subset is selected by comparing 1) a threshold and 2) the calculated probability of each inquiry being resolved by a human expert (e.g., by members of the plurality of experts). In other embodiments, the subset is selected by comparing 1) a threshold and 2) the calculated probability of each inquiry being resolved by Automated Response Logic 190 (or some other automated response system). A machine learning system, included within Acceptance Logic 157, may be applied to each customer service inquiry and data characterizing members of the plurality of experts retrieved in Retrieve Step 225. Accept Step 235 is optionally performed using Acceptance Logic 157.

In a Route Step 240 each member of the subset accepted in Accept Step 235 is routed to at least one of the plurality of experts and/or automatic response logic, e.g., Automated Response Logic 190. Route Step 240 is optionally performed using Routing Logic 165, as discussed elsewhere herein. Routing Logic 165 may use a trained machine learning system for this purpose.

In an optional Receive Response Step 245, a response to one or more members of the subset of the plurality of inquiries is received. The response may be a complete response or a partial response. For example, the response may be a complete response that is ready to be provided to a requester; or the response may be a partial response including content received from one or more of the plurality of experts and/or received from Automated Response Logic 190. Complete responses may be automatically communicated to a requester. As is discussed elsewhere herein, a response may include contributions from both human expert and automated systems. A human expert may modify a partial response provide by an automated system. Completed responses are optionally sent directly to request sources, e.g., sent to Enterprise 130, Contact Center 125, and/or members of Client Devices 110. Partial responses are not typically sent directly to Client Devices 110, although they may be sent to Enterprise 130 and/or Contact Centers 125 for modification and/or approval.

In an optional Score Response Step 250, the response received in Response Step 245 is scored using Scoring Logic 160. The scoring can be based on any of the criteria discussed herein with regard to Scoring Logic 160. In some embodiments, separate scores are calculated for contributions of different human experts and/or Automated Response Logic 190. Both human and/or automated contributions to a response may be scored. The scores are typically intended to be a measure of a quality of the response.

In an optional Reward Step 255, a reward is provided to one or more of the plurality of experts. The reward is compensation for contributing to a response to one of the subset of customer service inquires. The reward is optionally a financial reward. The reward may be for contributing all or part of a response. More than one of the plurality of experts may receive a reward for contributing to the same response. In some embodiments, the reward is made for a contribution to response content that is later provided by Automated Response Logic 190. For example, a first human expert may contribute to a response to a first customer service inquiry. The first human user can receive a reward for this contribution, e.g., based on a good score etc. That contribution can then be incorporated in a response stored in Automated Response Data 195 for later use by Automated Response Logic 190. When the stored response is later used (again) by Automated Response Logic 190, the first human expert can then receive an additional reward for the later use of the contribution. The first human expert can receive repeated rewards (2 or more) for a contribution that is used repeatedly (2 or more times) to respond to customer service inquiries from different sources, e.g., different members of Client Devices 110.

FIG. 3 illustrates a method of automatically processing a customer service inquiry, according to various embodiments of the invention. The methods illustrated optionally include a combination of human agents and automated response systems. For example, they may use Automated Response Logic 190 as well as internal and/or external agents at Expert Devices 115. The methods optionally makes use of multiple machine learning systems and these machine learning systems may be trained using scored responses to customer service inquiries.

In a Receive Inquiries Step 310 a plurality of customer service inquiries is received by Expert Management System 105. These inquiries may be received from Client Devices 110, Enterprise 130, and/or Contact Center 125. Receive Inquires Step 310 is optionally an embodiment of Receive Stream Step 215.

In a Provide Responses Step 315, responses to the customer services inquires received in Receive Inquiries Step 310 are provided. The Responses are typically provided to the sources of the respective requests. The responses provided are optionally generated using a plurality of internal and/or external human experts, as described elsewhere herein. Provide Responses Step 315 optionally includes Steps 215-240 and/or 245 as discussed with respect to FIG. 2.

In a Score Step 320, a score is generated for each of the responses provided in Provide Responses Step 315. This score may be generated using Scoring Logic 160 and is typically intended to represent a measure of the quality of each of the responses.

In an optional Select Step 325, the scored responses are divided into two or more subsets based on their score. For example, Training Logic 147 may be used to select a first subset including the top quartile of the scores and a second subset including the bottom quartile of the scores. This first subset is associated with higher scores relative to the second subset of responses. Different subsets may be selected.

In a Train Step 330, a first machine learning system is trained using Training Logic 147. The first machine learning system is trained using the customer service queries received in Receive Inquiries Step 310, the responses provide in Provide Responses Step 315, and/or the scores calculated in Score Step 320. In various embodiments, all of the scores (and associated inquiries/responses), a first subset of the scores (and associated inquiries/responses), and/or a second subset of the scores (and associated inquiries/responses), are used in the training. For example, in one embodiment, a subset including the highest ⅓ of the scores and a subset including the lowest ⅓ of the scores is used for training of the first machine learning system. (The lowest subset representing a negative/undesirable result.) In another embodiment, only the highest 20% of scores and associated inquiries/responses are used to train the first machine learning system. Machine learning system coefficients (e.g., neural network coefficients) generated in Train Step 330 are optionally stored in Automated Response Data 195.

In a Provide Step 335, a first customer service inquiry is received by Expert Management System 105 and provided to the first machine learning system. This customer service inquiry is typically not a member of the customer services inquiries received in Receive Inquiries Step 310.

In a Generate Step 340, a partial response or complete response to the first customer service inquiry is generated. The (at least partial) response is generated using the machine learning system of Augmented Response Logic 190 as trained in Train Step 330. Thus, the customer service inquires received in Receive Inquiries Step 310 are used to train the machine learning system and the trained machine learning system is subsequently used to generate a partial or complete response to the first customer service inquiry.

In an optional Complete Step 345, a partial response generated using the trained machine learning system in Generate Step 340 is used to generate a complete response to the first consumer service inquiry. As is discussed elsewhere herein, the complete response is optionally generated by having a human expert approve, modify and/or supplement a partial response generated by Automated Response Logic 190. Complete Step 345 is unnecessary if the response generated in Generate Step 340 was a complete response.

In an optional Provide Step 350, the complete response to the first customer service inquiry is provided, typically to a source of the first customer service inquiry.

In an optional Score Response Step 353, a score is generated for the complete response to the first machine learning system provided in Provide Step 350. As in Score Step 320, the score is typically generated using Scoring Logic 160. This score is for a response that includes a contribution of the first machine learning system, generated in Generate Step 340. Score Response Step 353 is optionally an embodiment of Score Response Step 250.

In an optional Train Step 355, a second machine learning system is trained using the first customer service inquiry, the response provided in Provide Step 350, and/or the score generated in Score Response Step 353. Note that an output of the first machine learning system is used to train the second machine learning system. The second machine learning system may be part of machine learning systems taught herein to be part of Routing Logic 165, Acceptance Logic 157, and/or Specialty Discovery Logic 187.

In a Receive Step 360, a second customer service inquiry is received at Expert Management System 105. This inquiry may be different from the first customer service inquiry. The second customer service inquiry may be from Enterprise 130, Contact Center 125 or members of Client Devices 110.

In a Determine Step 365, the second machine learning system is optionally used to determine if the second customer service inquiry should be provided to the first machine learning system for generation of at least a partial response to the second customer service inquiry. For example, once trained the second machine learning system may be used to determine acceptance and/or routing of additional customer service inquires. Alternatively, in Determine Step 365, the second machine learning system is used to determine specialty characteristics of human experts, e.g., as part of Specialty Discovery Logic 187.

In summary, the method illustrated in FIG. 3 involves processing customer service inquires using human experts, evaluating the responses provide by the human experts and then using the inquiries, responses and evaluations to train a first machine learning system. The first machine learning system being configured to generate partial or complete responses to additional customer service inquiries. The responses generated by the first machine learning system (with optional further human contribution) may then be scored, and these responses and scores used to train a second machine learning system. The second machine learning system may be configured for accepting customer service inquiries, routing customer service inquiries, determine expert specialty characteristics, and/or the like.

In alternative embodiments, the machine learning system (e.g., artificial neural network or artificial intelligence system) configured for accepting customer service inquiries, routing customer service inquiries, or determine expert specialty characteristics, etc. is trained based on scored responses to customer service requests that are solely generated by human experts. In these cases, the second machine learning system does not require training data (e.g., scored requests) that include contributions from the first machine learning system. As such Steps 310-330 of FIG. 3 are optional.

FIG. 4 illustrates a method of classifying customer service inquiries, according to various embodiments of the invention. In this approach customer service inquiries are processed to detect "clusters" of inquiries based on prior inquiries and responses. The processing is optionally performed using Cluster Detection Logic 127 (See FIG. 1), and may include identification of new clusters to which customer service inquiries may be classified. Clusters identified by Cluster Detection Logic 127 may be confirmed or denied by internal and/or external experts. These experts may further be given an opportunity to create authoritative responses that can later be used by embodiments of Automated Response Logic 190 to respond to customer service inquiries within the same cluster. Reward Logic 180 is optionally configured to track use of authoritative responses and provided prorated rewards to experts who contributed to those responses that are used.

In a Receive Inquiries Step 310 a set of customer service inquiries are received by Expert Management System 105, as discussed elsewhere herein. These customer service inquires may be received from Contact Center 125 and/or Client Devices 110.

In a Cluster Search Step 410 the received customer service inquiries are searched to identify those that fall into previously identified/approved/established clusters. For example, one or more of the customer service inquiries may be identified as belonging in a cluster on the topic of setup steps for a specific electronic device. In addition, Cluster Search Step 410 optionally includes identification of clusters that are not previously identified, approved, and/or established. For example, if a significant number of customer service inquires relate to booking on a new airline route, this particular booking may be identified as a new cluster. Cluster Search Step 410 is optionally performed by Cluster Detection Logic 127 and/or Routing Logic 165, (or a machine learning system therein)

In an optional Confirm Cluster Step 415 the inclusion of a particular customer service inquiry in a particularly cluster is confirmed by a human expert using one of Expert Devices 115. Alternatively, the identification of a new cluster may be confirmed by one or more human expert. Once confirmed by a person, a newly identified cluster may be considered "approved."

In an optional Prepare Responses Step 420, one or more responses to a cluster of customer service are prepared. Such responses are typically prepared by an internal or external human expert. In some embodiments, responses intended for clusters of customer service inquiries are subject to review by multiple experts before approval. The prepared responses can include complete responses or partial responses (e.g., response templates). The prepared responses are optionally stored in Response Log Storage 185.

In a Train Step 425, those customer service inquires identified as being part of a particular cluster (and optionally confirmed as such) are used to train a machine learning system of Cluster Detection Logic 127, Matching Logic 155, Routing Logic 165 and/or Automated Response Logic 190. Various purposes of the training are to improve the accuracy of automatically identifying customer services inquiries as being members of predetermined clusters, to improve identification of new clusters of customer service inquiries, and/or to improve the score of automated responses provided for customer service inquires identified as being members of clusters. As is described elsewhere herein, such training can be based in part on a response score generated by Scoring Logic 160.

The Steps 310, 410, 415, 420 and 425 are optional in embodiments that already include a well-trained machine learning system.

In a repeat of Receive Inquires Step 310, additional customer service inquiries are received by Expert Management System 105 from Client Devices 110 and/or Contact Center 125.

In a Match Cluster Step 430 the additional customer service inquires received in Receive Inquires Step 310 are matched to a particular cluster. This matching is optionally performed using the machine learning system trained in Train Step 425. The identification of one or more clusters to which a particular customer service request is a member is optionally used by Matching Logic 155 and/or Routing Logic 165 to route the customer service request to a particular human expert and/or to Automated Response Logic 190.

In an optional Provide Cluster Response Step 435, Automated Response Logic 190 may be used to provide predetermined responses to one or more of the customer service requests. These predetermined responses are optionally stored in Automated Response Data 195 and are typically associated with particular clusters matched in Match Cluster Step 430. The predetermined responses may be provided directly to sources of the customer services requests or may be completed/edited by human experts. In some embodiments, a partial predetermined response is completed by Automated Response Logic 190. For example, a predetermined response template may first be retrieved from Automated Response Data 195 based on the identification of one or more particular clusters that a customer service inquiry belongs. Automated Response Logic 190 may then be used to edit the response template to generate a complete response. The editing can include the addition of data particular to a specific customer, e.g., an account number, balance, customer name, etc.

In an optional Review Step 440 the response provided in Provide Cluster Response Step 425 is reviewed. The review may include review by a human expert prior to or after providing the response to the source of the customer service inquiry. In some embodiments, the review includes generation of a response score using Scoring Logic 160.

In an illustrative example, if an inquiry is found (with sufficient probability) to belong to an inquiry cluster, then Automated Response Logic 190 is optionally configured to provide an approved authoritative response, in response to the inquiry. An expert may participate in a same communication session (optionally over a same channel) through which the authoritative response is provided. As such, the expert may follow-up on the automatically provided authoritative response. Scoring Logic 160 is optionally used to score a previously approved authoritative response as the response applies to a particular customer service inquiry. Scores may be dependent on the inquiry as well as the automated response.

FIG. 5 illustrates methods of training a machine learning system using Training Logic 147, according to various embodiments of the invention. In these methods, a set of customer service inquiries and answers are received. The set is typically divided into training and testing subsets. In some embodiments, the set of customer service inquiries and answers have been scored using any of the systems and methods described elsewhere herein, e.g., using Scoring Logic 160. In other embodiments, the inquiries and answers are rated by Enterprise 130. Such ratings may be considered scores, although they are typically less accurate or precise.

The training of the machine learning system includes using inquiries previously sent to experts, the responses generated by the experts to these questions optionally including both positive and negative examples of responses. A particular inquiry may be associated with both positive and negative responses, if answered more than once. Positive responses are those that score well in response to a particular inquiry or have been designated as being well rated by Enterprise 130. Negative responses are those that score poorly or have low ratings, when used to answer an associated customer service inquiry. It is the combination of a particular inquiry and response that is typically characterized as positive or negative, or otherwise scored. As used herein, the characterization or scoring of a particular response is made with regard to a particular customer service inquiry or cluster thereof. The training is conducted so as to increase the changes of producing positive responses to new customer services inquiries, and optionally also so as to minimize the chances of producing negative responses to these inquiries. A particular customer service inquiry may be associated with more than one response, e.g., both positive and negative responses.

In Receive Inquires Step 310 customer service inquiries are received by Expert Management System 105, optionally via Request I/O 135. As noted elsewhere herein, the inquires may be received at a data warehouse from an ETL (Extract, Transform and Load) process, or alternatively received from a customer support queue of Call Center 125. The received inquiries are each associated with a response that may have been provided by Contact Center 125 or Expert Management System 105. The received inquiries and associated responses are optionally stored in Inquiry Storage 137 in a Store Step 510. In the embodiments illustrated by FIG. 5, Receive Inquiries Step 310 optionally includes separating the customer service inquiries into training and testing subsets.

In a Retrieve Step 515 the customer service inquiries are retrieved from Inquiry Storage 137. Each of the customer service inquiries is associated with at least one respective response to that customer service inquiry. In an optional Filter Step 520 the customer services inquiries are separated according to whether they are associated with positive or negative responses. For example, some training uses only the top 1, 5, 10, 20 or 25% of positive responses, and/or some training uses positive responses and only the bottom 1, 5, 10, 20 or 25% of negative responses.

In a Text Analysis Step 525 text (and optionally images and/or other content) included in the customer service inquiries and associated answers are processed to place the content in a form more appropriate for automated understanding. For example, text may be processed by a natural language processor (NLP), may be de-convoluted using a grammar based model, may be translated, vectorized, and/or the like. In some embodiments, the text is processed using a Bag-of-Words model or Doc2Vec algorithms. The bag-of-words model is a simplifying representation used in natural language processing and information retrieval. In this model, a text (such as a sentence or a document) is represented as the bag (multiset) of its words, disregarding grammar and even word order but keeping multiplicity. Text Analysis Step 525 optionally includes tagging of images.

In a Train Step 530 a machine learning system is trained using the processed customer service inquiries and associated responses. The training can include positive and/or negative answers. In various examples, the training includes optimization of coefficients for a neural network, use of deep learning algorithms, and/or any other approach to machine learning. In various embodiments, training includes scores of responses that are based on customer feedback, based on feedback from internal and/or external experts, based on contribution to a collaborative response, based on sales, and/or any other criteria used by Scoring Logic 160 as discussed herein. Train Step 530 can be applied to an untrained machine learning system or to a previously trained machine learning system for the purpose of improving the accuracy of that system.

In a Test Model Step 540 the machine learning system trained in Train Step 530 is tested. This testing may make use of a subset of the customer service inquiries set aside for testing as described above. Test Model Step 540 may be (alternatively or additionally) based on new customer service inquiries received from Client Devices 110 and/or Contact Center 125. In some embodiments, Test Model Step 540 includes processing of customer service inquiries using the machine learning system and then having the resulting responses scored using Scoring Logic 160. This scoring can be based on any of the approaches discussed herein with regard to Scoring Logic 160. These scores are then used to determine if the trained machine learning system is improved and/or is satisfactory for further use.

In a Post Step 545, if the testing in Test Model Step 540 is successful, then the trained machine learning system is provided to Cluster Detection Logic 127, Matching Logic 155, Routing Logic 165, and/or Automated Response Logic 190. Note that the training performed using the methods illustrated by FIG. 5 can be adapted to any of the machine learning systems included in Expert Management System 105. Steps 515-545 are optionally performed using Training Logic 147. The training is optionally ongoing. For example, as new customer service inquiries are received and responses generated and scored, positively scoring responses may be used for additional training of the machine learning system.

FIG. 6 illustrates methods of processing customer service requests, according to various embodiments of the invention. These methods optionally use a machine learning system trained using the methods illustrated by FIG. 5. The machine learning system may be included in Cluster Detection Logic 127, Automated Response Logic 190, Matching Logic 155, and/or Routing Logic 165.

In a Receive Inquiry Step 610, a customer service inquiry is received at Contact Center 125. At Contact Center 125 the inquiry may be resolved if human agents are available. Alternatively, in an Export Inquiry 615 Step 615 the customer service inquiry is sent to Expert Management System 105 from Contact Center 125.

In a Queue Inquiry Step 620, the customer service is placed in a queue for processing. This queue is optionally within part of Inquiry Storage 137.

In a Pre-Classify Inquiry Step 625, the customer service inquiry is pre-classified into several alternative groups. These groups include, for example, "foreign language," "incomplete inquiry," "test sample," "reject," "expect negative score," and/or "answerable." A question that is in a foreign language may or may not be answerable if an expert is available with appropriate language skills, if the inquiry can be reliably translated, or if Automated Response Logic 190 and Routing Logic 165 have been trained in the language of the customer service inquiry. An inquiry may be incomplete if it does not have enough content for processing, e.g., includes merely "brown fox jumped." Customer service inquires designated as "test samples" are used to test processing of inquiries by Expert Management System 105. These inquiries are optionally randomly selected and can include less than 10, 5 or 1% of received inquiries. "Rejected" customer service inquiries are returned to Contact Center 125 for processing. "Answerable" customer service inquiries are those predicted to have a good probability to result in a favorable response. Classification of an inquiry as "answerable" may depend on the experts that are currently available, on a probably calculation performed by Matching Logic 155 or Routing Logic 165, and/or the like. In some embodiments, a probability of a response score above a specified threshold is calculated, and "answerable" inquiries must have a calculated probability above a predetermined threshold. The calculated probability is optionally dependent on classification of the customer service inquiry in a specific cluster.

If the expert system training includes the use of negatively scored responses, then those with expected negative scores are optionally also excepted for processing.

Pre-Classify Inquiry Step 625 may be performed by Cluster Detection Logic 127, Matching Logic 155, Routing Logic 165, and/or Inquiry Parser 140.

In a Route 630 the customer service inquiry is routed according to the pre-classification of Step 625. Inquiries classified as "sample" are routed to a Generate Response Step 655, in this step a response is generated by Expert Management System 105 optionally using the systems and methods described herein. The resulting response can then be scored using Scoring Logic 160. Test samples are useful to detect changes in the capabilities of Expert Management System 105. For example, the addition of new external or internal experts may mean that a customer support inquiry that previously was unanswerable can now receive response having a satisfactory score.

Inquiries classified as "answerable" are processed using the elements of Expert Management System 105 to generate a response, as described elsewhere herein. This optionally includes Text Analysis Step 535 in which the text of the customer service inquiry is processed as described elsewhere herein. Note that Text Analysis Step 535 optionally occurs prior to Pre-Classify Inquiry Step 625, and may be performed using Inquiry Parser 140 and/or Cluster Detection Logic 127.

In a Classify Inquiry Step 640 the customer service inquiry is classified to determine if it can be answered by Automated Response Logic 190, by an internal expert, and/or by an (available) external expert. This classification optionally uses the various machine learning systems discussed elsewhere herein, for example, a machine learning system trained using the methods of FIG. 5. Classify Inquiry Step 640 optionally uses information calculated in Pre-Classify Inquiry Step 625. In some embodiments, this information is sufficient and no further classification is needed in Classify Inquiry Step 640.

In a Passed? Step 645 customer service inquiries are routed to Generate Response Step 655 if an acceptable response can be expected according to Classify Inquiry Step 640 (or Pre-Classify Inquiry Step 625). If negative responses are used in training, some customer service inquiries for which poor responses are expected may also be routed to Generate Response Step 655. Inquiries not routed to Generate Response Step 655 are optionally returned to Contact Center 125. Note that the ability to generate satisfactory responses to a customer service inquiry may change with time as expert availability changes. Generated responses are typically provided to a source of the customer service inquiry.

Several embodiments are specifically illustrated and/or described herein. However, it will be appreciated that modifications and variations are covered by the above teachings and within the scope of the appended claims without departing from the spirit and intended scope thereof. For example, while the examples provided herein are directed at "customer" inquiries, the disclosed systems and methods may be applied to inquiries from entities other than customers. For example, business to business service inquiries or inquiries made to government entities. Likewise, while customer service inquiries are used as an example herein, the disclosed system and methods may be applied to various types of inquiries, e.g., inquiries for support, information, actions, sales, employment, service inquiries, and/or work requests (workflow). In some embodiments service inquiries are internal to an enterprise. For example, the systems and methods described herein may enhance communication within an enterprise or enterprise social network.

Further, while customer service is used as an example herein, the systems and methods described can easily be adapted to other tasks. For example, a community of external experts (and optional machine learning systems), may be used to approve expenses, approve advertisements, grade schoolwork, review applications (for jobs, permits, government programs, credit, licenses, grants, admission, insurance, loans, financial aid, etc.), approve advertisements, identify image contents, review content, classification, route work flow, complete forms, work completion, perform surveys, proofreading, and/or the like.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer—readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

What is claimed is:

1. An expert management system configured to manage customer service inquiries, the system comprising:
   a request I/O configured to receive a stream of customer service inquiries;
   an inquiry parser configured to determine one or more topic characteristics of each of the customer service inquiries;
   status logic configured to monitor statuses of a plurality of experts;
   expert data storage configured to store data characterizing one or more specialty characteristics of each of the plurality of experts;
   acceptance logic configured to accept a subset of the inquires for processing by a first human expert, the acceptance being based on availability of the first human expert and predicted probabilities that the first human expert will be able to resolve each member of the subset of inquiries, the first human expert being a member of the plurality of experts; and
   routing logic configured to route the subset of inquiries to the first human expert.

2. The system of claim 1, wherein the probabilities are based on a score of the first human expert.

3. The system of claim 1, wherein the probabilities are based on topic characteristics of the customer service inquiries and at least one specialty characteristic of the first human expert.

4. The system of claim 1, wherein the routing logic is further configured to direct members of the stream of customer service inquiries that are not accepted to a contact center.

5. The system of claim 1, wherein the probabilities are estimated in real-time as the customer service inquiries are received.

6. The system of claim 1, wherein the acceptance of the subset of the inquires is based on comparison of an estimated probability for each of the inquires and a threshold probability.

7. The system of claim 1, wherein the acceptance logic includes a machine learning system trained based on response scores generated using scoring logic.

8. An expert management system configured to manage customer service inquiries, the system comprising:
   a request I/O configured to receive a stream of customer service inquiries;
   an inquiry parser configured to determine one or more topic characteristics of each of the inquiries;
   status logic configured to monitor statuses of a plurality of human experts;
   expert data storage configured to store data characterizing one or more specialty characteristics of each member of the plurality of experts;
   acceptance logic configured to estimate probabilities that at least one human expert or an automated response will be able to resolve each of the customer service inquiries, and configured to accept a subset of the inquires for processing based on the estimated probabilities, at least one probability being calculated for each of the customer service inquiries; and
   routing logic configured to route the inquiry to the at least one human expert or automated response logic.

9. The system of claim 8, wherein the acceptance logic is configured to estimate the probabilities that the available human expert will be able to resolve each of the customer service inquiries, respectively.

10. The system of claim 8, wherein the probabilities are based on correlation between the topic characteristics of each of the inquiries and specialty characteristics of each of the plurality of human experts.

11. The system of claim 8, wherein the probabilities are based on an output of a machine learning system.

12. The system of claim 8, wherein the probabilities are based on an analysis of text within each of the customer service inquiries.

13. The system of claim 8, wherein the probabilities are based on an expertise of each of the available human experts.

14. The system of claim 8, wherein the probabilities are based on a source of each of the customer service inquiries.

15. The system of claim 8, wherein the probabilities are estimated in real-time as the customer service inquiries are received.

16. The system of claim 8, wherein the acceptance of the subset of the inquires is based on comparison between 1) a threshold probability and 2) an estimated probability for each of the customer service inquires.

17. The system of claim 16, wherein the acceptance logic is configured to vary the threshold probability as a function of a number of inquiries in the stream of customer service inquiries or a number of available experts.

18. The system of claim 8, further comprising specialty discovery logic configured to identify one or more specialty characteristics of a member of the plurality of human experts based on communications between a source of a customer service inquiry and the member of the plurality of human experts.

19. A method of processing a customer service inquiry, the method comprising:
- monitoring, with status logic, status of a plurality of experts;
- receiving, with a request I/O, a stream of customer service inquiries;
- parsing, with an inquiry parser, each of the customer service inquiries to determine one or more topic characteristics of each of the customer service inquiries;
- retrieving specialty characteristics of each of the plurality of experts from a data storage;
- calculating, with acceptance logic, a probability that each of the plurality of experts can resolve each of the customer service inquiries, the calculation being based on the topic characteristics of each inquiry and the specialty characteristics of each of the plurality of experts;
- accepting, with the acceptance logic, a subset of the plurality of inquiries by comparing 1) a threshold and 2) the calculated probability of each inquiry being resolved by a human expert, the human expert being a member of the plurality of experts; and
- routing, with routing logic, each member of the subset to at least one member of the plurality of experts.

20. The method of claim 19, further comprising receiving a complete response to a member of the subset of the plurality of inquiries, the complete response including content received from at least one of the plurality of experts and an automated response logic, the automated response logic including a machine learning system.

21. The method of claim 20, wherein the machine learning system is trained using scored responses to customer service inquiries.

22. The method of claim 20, wherein further comprising scoring the complete response to produce a measure of a quality of the complete response.

23. The method of claim 19, further comprising providing a reward to one of the plurality of experts as compensation for contributing to a response to one of the subset of customer service inquiries.

24. The method of claim 23, wherein more than one of the plurality of experts receives a reward as compensation for contribution to the response to one of the subset of customer service inquiries.

25. The method of claim 23, wherein one of the plurality of experts receives a reward for the contribution multiple times, when the contribution is used to respond to customer service inquiries from different sources.

26. The method of claim 23, wherein the reward to one of the plurality of experts is for contribution to at least a partial response provided by automated response logic.

* * * * *